(12) United States Patent
Hall

(10) Patent No.: US 6,877,714 B2
(45) Date of Patent: Apr. 12, 2005

(54) FLOW CONTROL VALVE HAVING DIFFERENTLY CONFIGURED LABYRINTHS TO SELECT CLOSING SPEED

(75) Inventor: Leslie R. Hall, Rome (IT)

(73) Assignee: The Toro Company, Bloomington, MN (US)

(*) Notice: Subject to any disclaimer, the term of this patent is extended or adjusted under 35 U.S.C. 154(b) by 100 days.

(21) Appl. No.: 10/434,432

(22) Filed: May 8, 2003

(65) Prior Publication Data

US 2004/0222394 A1 Nov. 11, 2004

(51) Int. Cl.$^7$ .............................................. F16K 31/12
(52) U.S. Cl. .................... 251/45; 251/30.02; 137/270; 138/42
(58) Field of Search .................. 251/30.01, 30.02, 251/33, 45; 137/270; 138/42, 43

(56) References Cited

U.S. PATENT DOCUMENTS

| | | | |
|---|---|---|---|
| 3,439,895 A | * | 4/1969 | Ali .......................... 251/30.02 |
| 3,591,126 A | | 7/1971 | Hauser |
| 3,593,957 A | | 7/1971 | Dolter et al. |
| 3,979,070 A | | 9/1976 | Lemelshtrich |
| 4,105,186 A | | 8/1978 | Eby |
| 4,180,236 A | | 12/1979 | Saarem et al. |
| 4,206,901 A | | 6/1980 | Williams |
| 4,209,133 A | | 6/1980 | Mehoudar |
| 4,215,822 A | | 8/1980 | Mehoudar |
| 4,384,680 A | | 5/1983 | Mehoudar |
| 4,477,051 A | * | 10/1984 | Ben-Yehuda ............. 251/30.01 |
| 4,533,083 A | | 8/1985 | Tucker |
| 4,662,602 A | | 5/1987 | Johnson |
| 4,718,608 A | | 1/1988 | Mehoudar |
| 4,874,017 A | | 10/1989 | Hendrickson |
| 5,031,837 A | | 7/1991 | Hanish |
| 5,102,095 A | | 4/1992 | Schmitt |
| 5,207,386 A | | 5/1993 | Mehoudar |
| 5,213,124 A | | 5/1993 | Costa |
| 5,213,303 A | | 5/1993 | Walker |
| 5,251,871 A | | 10/1993 | Suzuki |
| 5,413,282 A | | 5/1995 | Boswell |
| 5,732,929 A | | 3/1998 | Luppino et al. |
| 5,979,863 A | | 11/1999 | Lousberg |
| 6,263,901 B1 | | 7/2001 | Lohde et al. |
| 6,296,227 B1 | | 10/2001 | Burcham et al. |

* cited by examiner

*Primary Examiner*—Edward K. Look
*Assistant Examiner*—John K. Fristoe, Jr.
(74) *Attorney, Agent, or Firm*—James W. Miller

(57) ABSTRACT

A flow control valve having a valve member engageable with a valve seat. The valve opens when the valve member disengages the valve seat as fluid pressure is bled from a pressure chamber on one side of the valve member. The valve closes after the pressure bleed ends when fluid pressure is metered back into the pressure chamber through a metering path. The speed at which the valve member closes is selectable depending upon the degree to which the metering path is tortuous. Two different tortuous configurations of the metering path are provided by two differently shaped labyrinths. The user can select one closing speed or the other by choosing which labyrinth is in the metering path.

17 Claims, 3 Drawing Sheets

FLOW CONTROL VALVE HAVING DIFFERENTLY CONFIGURED LABYRINTHS TO SELECT CLOSING SPEED

TECHNICAL FIELD

This invention relates to a flow control valve for controlling the passage of fluids such as water in an irrigation system. More particularly, this invention relates to a fluid flow control valve that is able to close at different speeds with the user having the ability to select a desired closing speed from among the different speeds.

BACKGROUND OF THE INVENTION

Flow control valves are well known in irrigation systems. Such valves control the flow or passage of water through an upstream pipe and thereby turn sprinklers fed by the pipe on and off. Such valves are often remotely controlled by control signals sent from an automated irrigation controller. For example, the controller often sends an electric actuating signal to a solenoid that is part of the valve to open the valve.

Certain known flow control valves have upstream fluid pressure on both sides of the valve member when the valve is closed. When the solenoid is actuated, the fluid pressure in a pressure chamber on one side of the valve member is exhausted or relieved. The upstream fluid pressure is then free to act on the other side of the valve member to disengage the valve member from the valve seat to open the valve. When the solenoid closes, upstream fluid pressure is then metered back into the pressure chamber through a metering path to restore the pressure balance across the valve member. This causes the valve member to reengage against the valve seat to close the valve. U.S. Pat. No. 6,263,901 to Lohde et al., which is assigned to the assignee of this invention, discloses a valve of this type.

In known flow control valves, the rate of flow into the pressure chamber through the metering path is what determines how quickly the valve closes. It is known in the art that the metering path can be sized to provide a particular closure rate. However, once this is done, the valve thereafter closes at that rate, subject to the caveat that the pressure differential across the valve member affects the closing rate as well. However, for a given design pressure differential across the valve member, a particularly sized metering path will provide a single valve closing speed.

Certain irrigation applications would ideally utilize flow control valves having different closing speeds. For example, in commercial turf applications, the flow control valve is typically open for an irrigation cycle lasting from 30 to 60 minutes. A standard valve used in such an application might take 20 seconds or so to close after the solenoid reseats. However, 20 seconds is only a small part of the irrigation cycle time, i.e. only about 0.5 to 1.0% of the total cycle time, so that such a valve closing speed is acceptable.

On the other hand, in other irrigation applications, such as greenhouse, nursery or small scale agricultural applications, a typical irrigation cycle might be much shorter. Sometimes a desired irrigation cycle might last only 30 to 60 seconds instead of 30 to 60 minutes. A valve closure time of 20 seconds then becomes an unacceptably large portion of the entire irrigation cycle. It would be desirable to have a valve that would close much more quickly than a standard valve for use in these applications.

Separate valves could be manufactured and provided having different closing rates. However, this requires different valve models and requires the retailer and installer of the valves to have the separate models on hand for use in all prospective applications. It also requires the installer to install the correct valve required for each application. There is a need in the art for a flow control valve having a plurality of closing rates with one rate being selectively chosen by the user in one application and another rate being chosen by the user in another application. However, prior to this invention, such a flow control valve was neither known nor available in the art.

SUMMARY OF THE INVENTION

One aspect of this invention relates to a fluid flow control valve. The valve comprises a valve housing having an inlet, an outlet, and a flow passageway between the inlet and outlet. A valve seat is located in the flow passageway. A valve member closes the valve by moving into engagement with the valve seat for blocking flow between the inlet and the outlet and opens the valve by moving out of engagement with the valve seat for permitting flow between the inlet and the outlet. A pressure chamber is provided in the valve housing. One side of the valve member is exposed to inlet fluid pressure tending to move the valve member away from the valve seat and the other side of the valve member is exposed to fluid pressure in the pressure chamber tending to move the valve member towards the valve seat. A metering path is provided to permit water to pass into the pressure chamber from upstream of the valve seat to close the valve. At least two water flow labyrinths are also provided with the labyrinths being differently configured relative to one another such that water flows through the labyrinths at different rates. One or the other of the labyrinths is selectively installed in the metering path to select a desired closing speed for the valve depending upon which labyrinth is in the metering path.

Another aspect of this invention relates to a flow control valve, which comprises a valve member engageable with a valve seat. The valve opens when the valve member disengages the valve seat as fluid pressure is bled from a pressure chamber on one side of the valve member. The valve closes after the fluid pressure bleed ends when fluid pressure is metered back into the pressure chamber through a metering path. The metering path is tortuous. At least two tortuous configurations of the metering path are provided for the metering path with one or the other of the tortuous configurations being selectively used at any one time to provide at least two different closing speeds for the valve member.

Yet another aspect of this invention relates to a flow control valve which comprises a valve housing having a valve seat, the valve housing comprising a valve bonnet secured to a valve body. A valve member engages and disengages the valve seat to close and open the valve, respectively. A pressure chamber is provided on one side of the valve member. A metering assembly is mounted in the valve housing for metering fluid pressure to the pressure chamber to close the valve. The metering assembly includes a plug which is selectively insertable into or removable from a bore in the valve housing without disassembling the valve bonnet from the valve body. The plug has a flow passageway therethrough. A labyrinth is carried on the plug in fluid communication with the flow passageway in the plug, the labyrinth defining a tortuous water flow path with the valve member having a closing speed that is dependent upon the degree the flow path in the labyrinth is tortuous.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
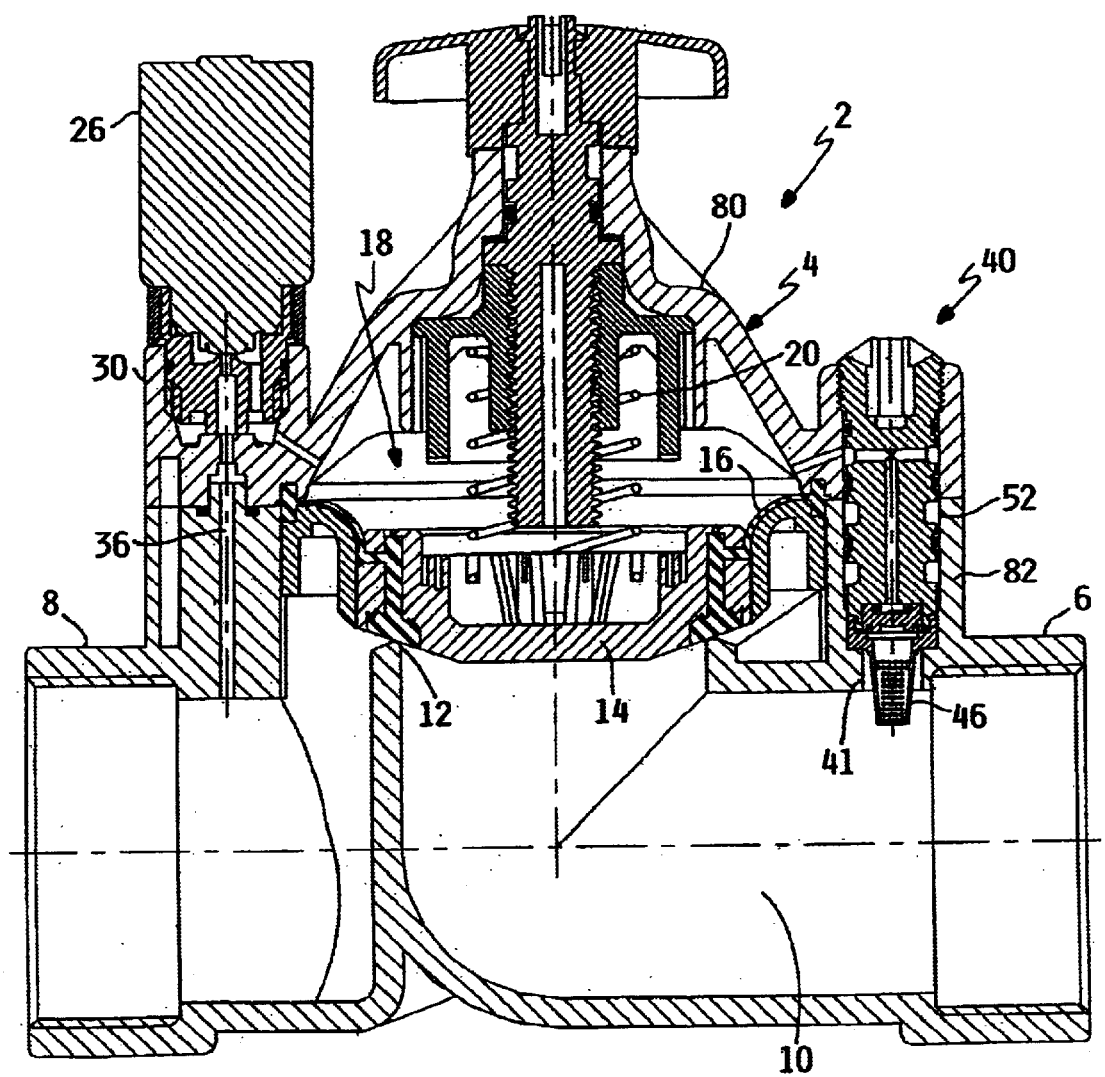
FIG. 1 is a is a longitudinal cross-sectional view of an irrigation valve according to this invention.

A fluid flow control valve 2 according to this invention comprises a valve housing 4 that can be installed in the piping of an irrigation system or the like. Valve housing 4 includes an inlet 6 that receives an inlet pipe (not shown) with the inlet pipe carrying water under pressure. Valve housing 4 includes an outlet 8 that similarly receives an outlet pipe (not shown). When valve 2 is open, a flow passageway 10 in valve housing 4 is opened allowing water to flow from inlet 6, through flow passageway 10, and then out through outlet 8.

An annular valve seat 12 is located inside valve housing 4 in flow passageway 10. A valve member 14 that is formed at least partially from a resilient diaphragm 16 is movable towards and away from valve seat 12. Valve 2 is closed when valve member 14 is urged against valve seat 12 as depicted in FIG. 1. Valve 2 is open when valve member 14 is lifted off valve seat 12.

Water under pressure at inlet 6 constantly acts on the underside of valve member 14 inside valve seat 12 urging valve member 14 up off valve seat 12. However, this force is counteracted by the same water pressure in a pressure chamber 18 formed in valve housing 4 above valve member 14. This balancing water pressure is able to act on a larger area of valve member 14 in pressure chamber 18 than the area acted on by the inlet water pressure, i.e. the area on the underside of valve member 14 located within valve seat 12, to develop a pressure differential that biases valve member 14 into engagement with valve seat 12. If desired, a spring 20 can be used within pressure chamber 18 further urging valve member 14 into engagement with valve seat 12. Thus, in the closed position of valve 2, the inlet water pressure urging valve member 14 upwardly is opposed and overcome by inlet water pressure within pressure chamber 18 and by the force of spring 20, both of which jointly urge valve member 14 down into engagement with valve seat 12.

Valve 2 is opened by bleeding off at least a portion of the water pressure in pressure chamber 18 at a faster rate than water is being metered into pressure chamber 18. A solenoid 26 is coupled to a socket 30 in the top of valve housing 4. When an electrical actuating signal is sent to solenoid 26 from an automated controller (not shown), the plunger of solenoid 26 is lifted to allow a bleed passage 36 extending into pressure chamber 18 to be opened to bleed the water inside pressure chamber 18 to downstream through outlet 8. Since this bleed is much more rapid than the rate at which water enters pressure chamber 18, the pressure in pressure chamber 18 is lowered to a point at which the pressure in pressure chamber 18 and the force of spring 20 is lower than the force of the inlet water pressure acting on the underside of valve member 14. This allows valve member 14 to lift up off valve seat 12 to open valve 2.

A metering assembly 40 meters water into pressure chamber 18. Metering assembly 40 comprises a generally cylindrical plug 42, a metering disc 44, and a filter screen 46. Metering assembly 40 can be installed in valve housing 4 to one side of valve member 14. When so installed, water upstream of valve member 14 can enter metering assembly 40 through a port 41 in flow passageway 10, can pass through filter screen 46, can then pass through metering assembly 40, and then can exit metering assembly 40 and pass through a metering port 48 in valve housing 14 which port 48 leads to pressure chamber 18. Port 41, metering assembly 40 and the various flow passages therein, and metering port 48 all define a metering path between pressure chamber 18 and upstream fluid pressure in flow passageway 10.

As will be described in more detail hereafter, metering assembly 40 has at least two different configurations to be able to select two different rates at which water can pass through metering assembly 40. This gives the user the ability to select from at least two selectively usable and different valve closing speeds. The selection is done according to how metering assembly 40 is configured prior to metering assembly 40 being installed in valve housing 4.

Plug 42 has a threaded upper end 50 to allow plug 42 to be threaded into a vertical bore 52 in valve housing 4. Plug 42 includes a plurality of O-ring seals 54 along the outer diameter of plug 42 to prevent leaks between plug 42 and bore 52. Plug 42 includes a T-shaped flow passageway 56 that communicates with metering port 48 when plug 42 is installed in valve housing 4. The lower end of flow passageway 56 is in communication with a cavity 58 on a lower end 60 of plug 42.

Figures 2, 3:
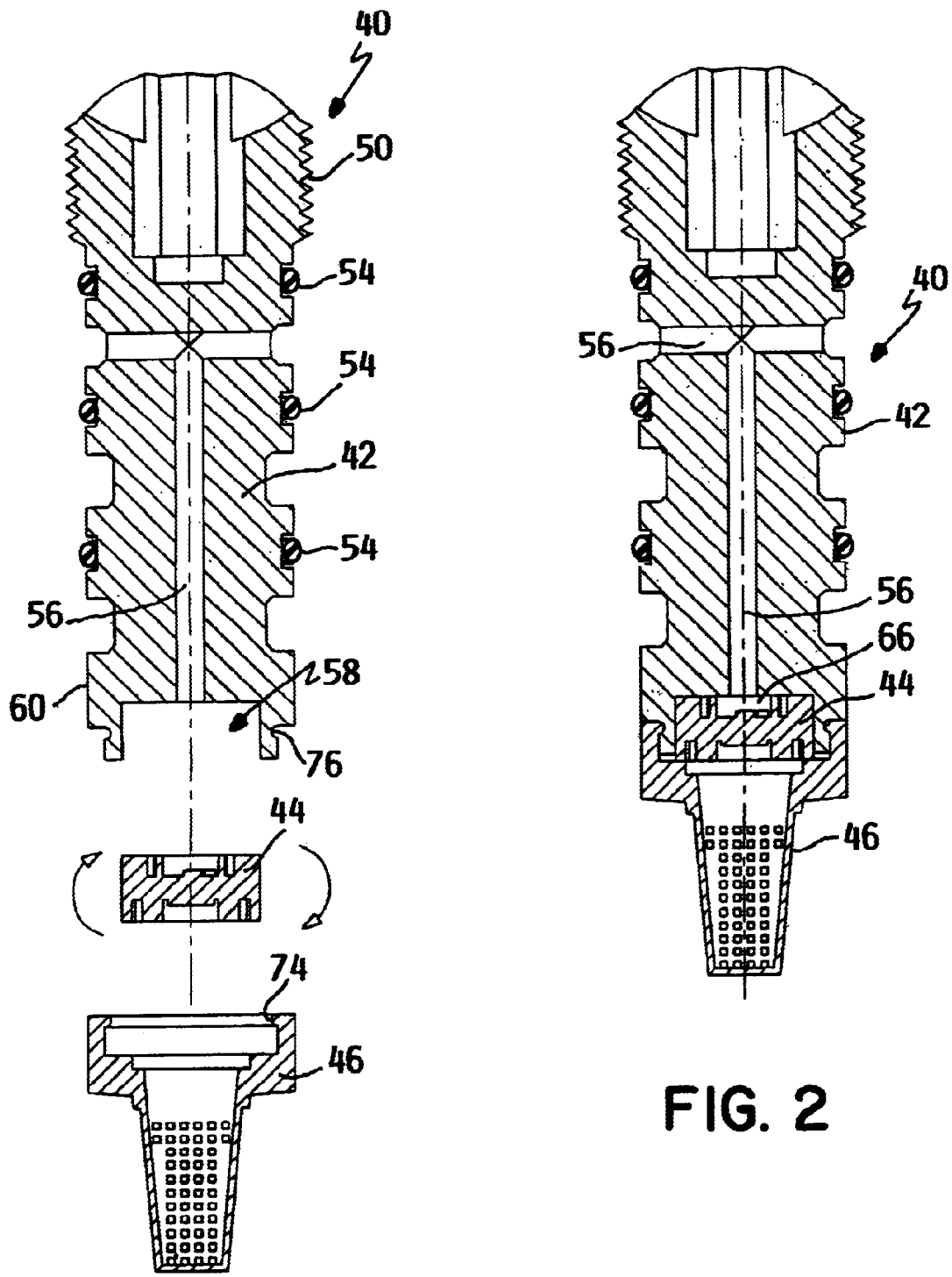
FIG. 2 is a cross-sectional view of a portion of the irrigation valve of FIG. 1, particularly illustrating the metering assembly that determines how quickly the valve closes.
FIG. 3 is an exploded cross-sectional view of the metering assembly shown in FIG. 2.

Metering disc 44 is shaped to be received in cavity 58 in lower end 60 of plug 42. In order for water to pass through flow passageway 56 in plug 42, the water must first pass through metering disc 44. Metering disc 44 is reversible within cavity 58 to change which side of metering disc 44 is uppermost in cavity 58. This reversal operation is graphically indicated by the arrows in FIG. 3. This is done to selectively vary the length of time that water takes to pass through metering disc 44 to select a particular valve closing speed.

Figure 4:
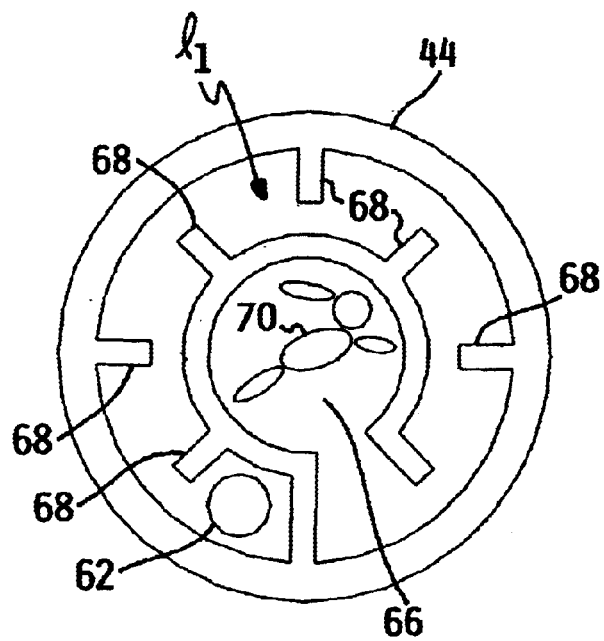
FIG. 4 is a top plan view of a portion of the metering assembly shown in FIGS. 2 and 3, particularly illustrating a first labyrinth on one side of a metering disc for providing a first valve closing speed.
Figure 6:
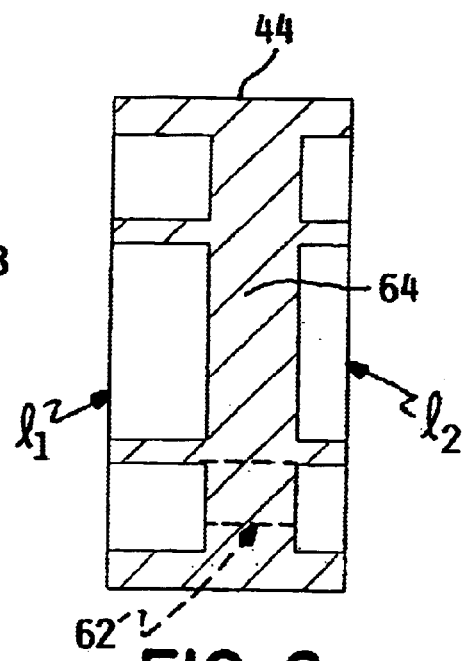
FIG. 6 is a cross-sectional view through the metering disc shown in FIG. 4.
Figure 5:
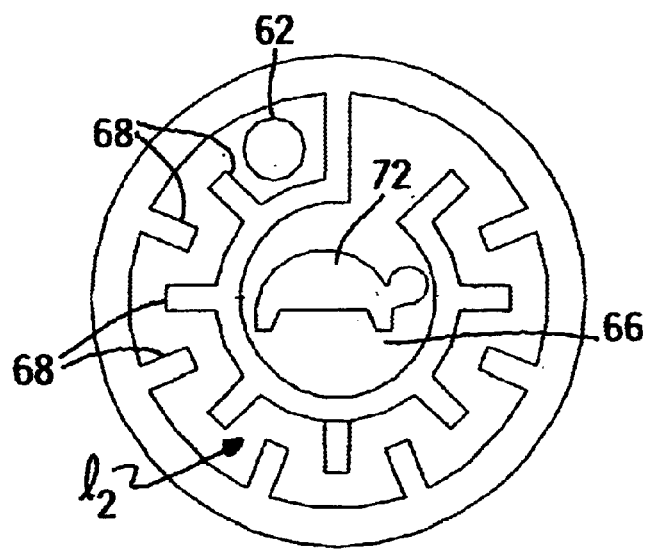
FIG. 5 is a top plan view similar to FIG. 4 of the metering disc shown in FIG. 4, particularly illustrating a second labyrinth on the side of the metering disc that is opposite to the side shown in FIG. 4 for providing a second valve closing speed.

Referring now to FIGS. 4 and 5, each side of metering disc 44 is provided with a flow labyrinth 1 similar to the types of labyrinths found on drip emitters in the irrigation industry. A first flow labyrinth $l_1$ is shown on one side of metering disc 44 in FIG. 4. A second different flow labyrinth $l_2$ is shown on the opposite side of metering disc 44 in FIG. 5. Each flow labyrinth l is fed by an inlet port 62 that passes through the central web 64 of metering disc 44. Inlet port 62 is offset to one side of metering disc 44.

Assuming now that the side of metering disc 44 shown in FIG. 4 is placed uppermost in cavity 58 of plug 42, water will pass up through inlet port 62 in metering disc 44 to enter labyrinth $l_1$ from inlet port 62. In order to pass up into and through flow passageway 56 in plug 42, the water must pass through labyrinth $l_1$ into a central chamber 66 of labyrinth $l_1$. It is central chamber 66 of labyrinth $l_1$ that communicates with flow passageway 56. The only way for water to pass from inlet port 62 to central chamber 66 of labyrinth $l_1$ is for the water to flow in a back and forth, serpentine fashion pass the various oppositely directed walls 68 that define labyrinth $l_1$. Only after moving past all the walls 68 of labyrinth $l_1$ to reach central chamber 66 can the water then leave metering disc 44 and pass on up through flow passageway 56 in plug 42.

As is apparent from FIG. 4, labyrinth $l_1$ formed on the side of metering disc 44 shown in FIG. 4 has relatively few walls 68 and thus is relatively open. Thus, water will pass relatively quickly through this labyrinth $l_1$ to be metered into pressure chamber 18 relatively quickly. This causes the valve closing speed to be relatively fast. Thus, when the user is using the valve in an application that requires a fast closing time for the valve, such as an irrigation application having very short irrigation cycles, the user would install metering disc 44 with the side shown in FIG. 4 uppermost in cavity 58 in lower end 60 of plug 42. A graphical symbol or mark, such as the "hare" or "rabbit" shape 70 shown in FIG. 4, can be molded onto that side of metering disc 44 to help guide the user in the installation of metering disc 44.

Referring now to the other side of metering disc 44 as shown in FIG. 5, a differently shaped labyrinth $l_2$ is carried on the other side of metering disc 44. This labyrinth $l_2$ uses more oppositely directed walls 68 and thus is more closed or serpentine than labyrinth $l_1$ shown in FIG. 4. Thus, water will take longer to pass through labyrinth $l_2$ shown in FIG. 5 than through labyrinth $l_1$ shown in FIG. 4. Consequently, labyrinth $l_2$ as shown in FIG. 5 meters water into pressure chamber 18 at a slower rate thus providing a different and slower valve closing speed. To select this slower valve closing speed, metering disc 44 need be installed in cavity 58 in lower end 60 of plug 42 with the side of metering disc 44 shown in FIG. 5 being uppermost. Again, this side is also provided with a graphical symbol, in this case a "tortoise" shape 72, to indicate to the user the relative closing speed provided by labyrinth $l_2$ formed on this side of metering disc 44.

Metering disc 44 is held in place in cavity 58 in lower end 60 of plug 42 by filter screen 46 which has a snap fit to lower end 60 of plug 42. The snap fit is formed by an annular, inwardly protruding ring 74 on the upper end of filter screen 46. Ring 74 snaps into an annular groove 76 on lower end 60 of plug 42. Thus, to reverse metering disc 44 within cavity 58, the user must first pull filter screen 46 off lower end 60 of plug 42. Then, the user will remove and reverse plug 42 within cavity 58 to change which side of metering disc 44 is uppermost in cavity 58, i.e. the side that had been uppermost will now be lowermost and vise versa. After metering disc 44 is so reversed within cavity 58, filter screen 46 can then be snapped back onto lower end 60 of plug 42 to retain metering disc 44 with plug 42. This metering disc reversal and the associated manipulation of filter screen 46 is done with plug 42 removed from valve housing 4 prior to plug 42 being screwed into bore 52.

Valve 2 of this invention provides the user with at least two different closing speeds for use in different irrigation applications. In an application requiring a slow closing speed or in an application in which the closing speed is not critical, the user can configure metering assembly 40 so that metering disc 44 has the side with "tortoise" 72 installed uppermost in cavity 58 in plug 42. When this is done, the more tortuous labyrinth $l_2$ on metering disc 44 is in place to slow down the rate at which water will be metered into pressure chamber 18. In an application requiring a faster closing valve speed, the user simply configures metering assembly 40 with metering disc 44 in a reversed position in plug 42, i.e. with the side having "hare" 70 being located uppermost in cavity 58.

In some instances, one could conceivably not wish the user to be able to select two different valve closing speeds. For example, one might wish to sell a valve only for use in a particular application that requires a single valve closing speed. In this situation, one could still use the same basic design approach as disclosed herein for valve 2, but metering disc 44 would have the same labyrinth l, either $l_1$ or $l_2$, formed on each side thereof. It would then not matter which side of metering disc 44 was uppermost in cavity 58 as the valve closing speed would be the same in either case. However, for a valve 2 for use in different applications that desirably use different valve closing speeds, metering disc 44 would have differently shaped labyrinths $l_1$ and $l_2$ on the opposed sides thereof as disclosed above.

Various modifications of this invention will be apparent to those skilled in the art. For example, mounting reversible metering disc 44 in valve housing 4 as part of plug 42 allows metering disc 44 to be reversed without disassembling the entire valve housing 4, namely without removing valve bonnet 80 from valve body 82 which are normally screwed or bolted together. However, if so desired, one could mount reversible metering disc 44 elsewhere in a location that would require disassembly of valve housing 4 for access to metering disc 44. For example, metering disc 44 could be mounted directly on valve member 14 such that water is metered into pressure chamber 18 through valve member 14 and not through valve housing 4.

In addition, filter screen 46 is desirably used on lower end 60 of plug 42 to hold or retain metering disc 44 in place since filter screen 46 can itself be easily removed for cleaning and/or replacement by removing plug 42 from valve housing 4 and by pulling filter screen 46 off the lower end 60 of plug 42. However, this location of filter screen 46 is not necessary. Filter screen 46 could be separated from plug 42 and metering disc 44 could be retained on plug 42 in some other fashion. Accordingly, the invention is to be limited only by the appended claims.

I claim:
1. A fluid flow control valve, which comprises:
(a) a valve housing having an inlet, an outlet, a flow passageway between the inlet and outlet, a valve seat in the flow passageway, and a valve member which closes the valve by moving into engagement with the valve seat for blocking flow between the inlet and the outlet and which opens the valve by moving out of engagement with the valve seat for permitting flow between the inlet and the outlet;
(b) a pressure chamber in the valve housing, wherein one side of the valve member is exposed to inlet fluid pressure tending to move the valve member away from the valve seat and the other side of the valve member is exposed to fluid pressure in the pressure chamber tending to move the valve member towards the valve seat;
(c) a metering path to meter water into the pressure chamber from upstream of the valve seat to close the valve; and
(d) at least two water flow labyrinths with the labyrinths being differently configured relative to one another such that water flows through the labyrinths at different rates, and wherein one or the other of the labyrinths is selectively installed in the metering path to select a desired closing speed for the valve depending upon which labyrinth is in the metering path.

2. The valve of claim 1, wherein the labyrinths are formed on opposite sides of a single reversible metering member.

3. The valve of claim 1, wherein the labyrinth in the metering path is installed in the valve housing and is removable and replaceable therefrom.

4. The valve of claim 1, wherein the labyrinth in the metering path is carried on a metering plug.

5. The valve of claim 4, wherein the metering plug is threaded into a bore on the valve housing to allow the metering plug and the labyrinth carried by the metering plug to be installed and removed from the valve housing.

6. The valve of claim 4, wherein the labyrinth is retained in place by a filter screen carried on one end of the metering plug.

7. The valve of claim 4, wherein the labyrinths are formed on opposite sides of a metering disc, and wherein the metering disc can be reversed on the metering plug to allow one labyrinth or the other labyrinth to be in the metering path.

8. A flow control valve, which comprises:
(a) a valve member engageable with a valve seat, wherein the valve opens when the valve member disengages the valve seat as fluid pressure is bled from a pressure chamber on one side of the valve member, and wherein the valve closes after the fluid pressure bleed ends when fluid pressure is metered back into the pressure chamber through a metering path;
(b) wherein the metering path is tortuous, and wherein at least two tortuous configurations of the metering path are provided for the metering path with one or the other of the tortuous configurations being selectively used at any one time to provide at least two different closing speeds for the valve member.

9. The valve of claim 8, wherein the two tortuous configurations are provided on a single reversible member, wherein one tortuous configuration is used when the member is installed in a first position and the other tortuous configuration is used when the member is installed in a second position that is reversed relative to the first position.

10. The valve of claim 9, wherein the single reversible member comprises a disk, and wherein the first tortuous configuration is provided by a first labyrinth formed on one side of the disk and the second tortuous configuration is provided by a second labyrinth formed on the other side of the disk.

11. A flow control valve, which comprises:
(a) a valve housing having a valve seat, the valve housing comprising a valve bonnet secured to a valve body;
(b) a valve member for engaging and disengaging the valve seat to close and open the valve, respectively;
(c) a pressure chamber on one side of the valve member and
(d) a metering assembly mounted in the valve housing for metering fluid pressure to the pressure chamber to close the valve, the metering assembly including:
(i) a plug which is selectively insertable into or removable from a bore in the valve housing without disassembling the valve bonnet from the valve body, the plug having a flow passageway therethrough; and
(ii) a labyrinth carried on the plug in fluid communication with the flow passageway in the plug, the labyrinth defining a tortuous water flow path with the valve member having a closing speed that is dependent upon the degree the flow path in the labyrinth is tortuous.

12. The valve of claim 11, wherein the labyrinth is removably carried on the plug.

13. The valve of claim 12, wherein the plug includes a cavity on one end, and wherein the labyrinth is formed on a disk that is removably inserted and retained in the cavity.

14. The valve of claim 13, wherein the disk is retained in the cavity on the one end of the plug by a filter screen removably attached to the one end of the plug.

15. The valve of claim 14, wherein the filter screen has a snap fit with the one end of the plug.

16. The valve of claim 13, wherein the disk has opposite sides, and wherein a different labyrinth is formed on each side of the disk such that the user can select between two different closing speeds for the valve member depending upon which labyrinth in the disk is in fluid communication with the flow passageway in the plug.

17. The valve of claim 11, wherein the plug is cylindrical and at least a portion of the plug is threaded to allow the metering assembly to be screwed into and out of the bore in the valve housing.

* * * * *